United States Patent
Sugawara et al.

(10) Patent No.: US 7,888,894 B2
(45) Date of Patent: Feb. 15, 2011

(54) ELECTRIC MOTOR CONTROL SYSTEM, SERIES HYBRID VEHICLE, ELECTRIC MOTOR CONTROL APPARATUS, AND ELECTRIC MOTOR CONTROL METHOD

(75) Inventors: Naoshi Sugawara, Hitachi (JP); Tetsuhiro Fujimoto, Hitachi (JP); Yasuhiro Kiyofuji, Hitachi (JP); Keizo Shimada, Hitachi (JP); Akira Kikuchi, Hitachi (JP); Kazuhiro Imaie, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 412 days.

(21) Appl. No.: 12/019,656

(22) Filed: Jan. 25, 2008

(65) Prior Publication Data

US 2008/0179122 A1 Jul. 31, 2008

(30) Foreign Application Priority Data

Jan. 29, 2007 (JP) ............................. 2007-017717

(51) Int. Cl.
*H02P 3/00* (2006.01)
*H02P 5/00* (2006.01)

(52) U.S. Cl. .................. 318/139; 318/140; 318/400.02; 318/400.07; 363/35

(58) Field of Classification Search .................. 318/34, 318/105, 245, 801, 400.02, 400.07, 139, 318/140; 363/35; 361/23, 93.1
See application file for complete search history.

(56) References Cited

U.S. PATENT DOCUMENTS

| | | | | |
|---|---|---|---|---|
| 5,047,699 A | * | 9/1991 | Rozman et al. | 318/400.07 |
| 5,438,502 A | * | 8/1995 | Rozman et al. | 363/35 |
| 7,012,389 B2 | * | 3/2006 | Kobayashi et al. | 318/400.02 |
| 7,276,865 B2 | * | 10/2007 | Ochiai | 318/34 |
| 7,355,826 B2 | * | 4/2008 | Ochiai et al. | 361/23 |
| 7,372,686 B2 | * | 5/2008 | Ochiai | 361/93.1 |
| 7,639,018 B2 | * | 12/2009 | Zettel et al. | 324/426 |
| 2003/0081434 A1 | | 5/2003 | Kikuchi et al. | |
| 2004/0150365 A1 | * | 8/2004 | Ochiai | 318/801 |
| 2004/0222754 A1 | * | 11/2004 | Ochiai et al. | 318/105 |
| 2006/0086547 A1 | | 4/2006 | Shimada et al. | |
| 2006/0181235 A1 | | 8/2006 | Imaie et al. | |

FOREIGN PATENT DOCUMENTS

| | | |
|---|---|---|
| JP | 2000-059915 | 2/2000 |
| JP | 2000-166009 | 6/2000 |
| JP | 2003-134898 | 5/2003 |
| JP | 2006-166684 | 4/2006 |
| JP | 2006-230084 | 8/2006 |

* cited by examiner

*Primary Examiner*—Paul Ip
(74) *Attorney, Agent, or Firm*—Antonelli, Terry, Stout & Kraus, LLP.

(57) ABSTRACT

An electric motor control system including a generator, an AC motor, a power converter for driving the AC motor using a DC output voltage of the generator, and an electric motor controller for controlling the power converter. The electric motor controller controls the power converter by predicting a change in the DC voltage.

27 Claims, 9 Drawing Sheets

ELECTRIC MOTOR CONTROL SYSTEM, SERIES HYBRID VEHICLE, ELECTRIC MOTOR CONTROL APPARATUS, AND ELECTRIC MOTOR CONTROL METHOD

BACKGROUND OF THE INVENTION

The present invention relates to an electric motor control system which drives an electric motor based on the prediction of a change in the DC voltage applied to a power converter; and also a series hybrid vehicle, an electric motor control apparatus, and an electric motor control method, based on the electric motor control system.

As disclosed in JP-A-2000-166009, there is known a series hybrid vehicle which includes an engine, an electric motor coupled to the engine and having a rectifier, a battery for being charged with an DC output of the motor, an inverter for converting a DC power charged by the battery into an AC power, an electric motor driven by a rectangular wave voltage generated by the inverter, and a drive mechanism for transmitting an output of the electric motor to wheels.

Since driving or tractive forces of mining or construction vehicles are extremely larger as compared with those of passenger cars, the mining or construction vehicle is generally an engine-driven vehicle which drives the wheels by engine power from the engine through a transmission of the vehicle. Such an engine-driven vehicle, however, has defects that braking operations cause considerable wear of brake pads and that a mechanical component such as the transmission has a short periodical exchange interval. From a viewpoint of a demand of reducing a maintenance cost and also from another viewpoint of such a limitation that a battery commensurate with an amount of necessary charged energy is too expensive, it is considered to utilize such a series hybrid vehicle requiring no battery mounted thereon.

In the engine-driven vehicle, in order to change the driving torque of wheels, it is necessary to change the output torque of an engine as a power source. However, this method is defective in that individual wheel torque adjustment cannot be made because the torques of all the wheels are changed at the same time, and that it is hard to make the torque adjustment immediately due to the influences of the response waste time and response time of the engine itself. The series hybrid vehicle not mounted with a battery utilizes the machine inertial energy of an engine generator and the electric energy of a DC circuit. A series hybrid vehicle mounted with a battery, however, can change the individual torques of wheels from the torque of an electric motor at high speed independently of each other by utilizing an electric energy charged in the battery. This can be attained, because the torque control of the engine and the torque control of the electric motor are independent of each other and also the motor torque control is much shorter in response time than the engine torque control.

A means for controlling the electric motor, further, is controlled to perform dq vector control for control of the current of the electric motor by dividing the electric motor current into an excitation magnetic flux component (d-axis component) and a torque current component (q-axis component) perpendicular to the excitation magnetic flux component, and a torque command is converted to a q-axis current command so as to make the electric motor current converged into the q-axis current command. In other words, the speed of the series hybrid vehicle is controlled by controlling the driving force (torque) of the motor on the basis of a motor torque command (torque current command) based on the amount of accelerator pedal depression (throttle opening) or the amount of brake depression.

When the q-axis component of an AC voltage (nearly synonymous with the amplitude of the AC voltage) is applied to the electric motor, the excitation magnetic flux component (d-axis component) is established with a time lag of first order as a response time constant (e.g., 1.3 seconds) inherent to the electric motor. The torque current command (q-axis component) is established with a response time constant (e.g., 0.1 seconds) to the motor control means. With respect to the motor torque proportional to a product of the magnetic flux component (d-axis component) and the torque current (q-axis component), in order to satisfy a demand of speeding up the control response of the motor torque, it is general to avoid or minimize a change in the excitation magnetic flux component (d-axis component) having a long response time constant. More specifically, the excitation magnetic flux component (d-axis component) in a low speed region is kept to have a constant value, and the excitation magnetic flux component in a high speed region (d-axis component) is gradually weakened from the viewpoint of a limitation that an applied voltage is required to have a constant voltage characteristic (weak excitation).

SUMMARY OF THE INVENTION

Meanwhile, a strong demand for lowering the engine speed in a no drive mode and increasing a system efficiency in a drive mode is given to the batteryless series hybrid vehicle for mining or construction use.

The engine is first coupled to the generator so that the output voltage of the generator varies with the engine speed, and a DC voltage obtained by rectifying the generator voltage also correspondingly varies. Since the engine speed drops in the no drive mode, the DC voltage is also decreased.

In order to reduce a switching loss generated in the inverter in the drive mode, one-pulse control is used in most of the speed region. In the region under the one-pulse control, variations in the DC voltage correspond, as they are, to variations in the amplitude of the AC voltage applied to the motor.

For this reason, the amplitude of the AC voltage applied to the motor (inverter voltage) depends on the engine speed (generator speed) and increases or decreases according to a change in the amount of accelerator pedal depression. The excitation magnetic flux of the electric motor varies with a delay or lag of first order in a response time constant inherent to the motor according to a change in the inverter voltage. However, since the prior art motor control means fails to consider the response first order lag in the excitation magnetic flux component (d-axis component), the means has a problem that the motor torque proportional to a product of the excitation magnetic flux and the motor current is changed later than the torque command.

It is therefore an object of the present invention to provide an electric motor control system in which the torque of an AC motor can follow up a target torque even when a DC voltage varies; and also to provide a series hybrid vehicle, an electric motor control apparatus, and an electric motor control method, based on the system.

In accordance with an aspect of the present invention, the above object is attained by providing an electric motor control system which includes a generator, an AC motor, a power converter for driving the AC motor using a DC output voltage of the generator, and an electric motor controller for controlling the power converter. In the motor controller controls the power converter by predicting a change in the DC voltage.

In the aspect of the invention, the power converter is controlled by predicting a change in the DC voltage. An excitation magnetic flux component (d-axis component) varies with a first order lag with respect to a voltage applied to the AC motor, but the voltage applied to the AC motor is varied faster by an excitation time constant. This can eliminate a deviation between the d-axis excitation magnetic flux component and an excitation magnetic flux generated in the motor. Further, the d-axis excitation magnetic flux component is passed through a first order delay circuit of an excitation time constant to find a d-axis magnetic flux estimated value. A torque current command (q-axis component) is set to have a value obtained by dividing the target torque by the d-axis magnetic flux estimated value. The motor torque is proportional to a product of the excitation magnetic flux component (d-axis component) and the torque current command (q-axis component). Accordingly, even when the DC voltage applied to the power converter varies, the motor torque can follow up the target torque.

In this manner, even when the DC voltage varies, the AC motor torque can follow up the target torque.

Other objects, features and advantages of the invention will become apparent from the following description of the embodiments of the invention taken in conjunction with the accompanying drawings.

DESCRIPTION OF THE EMBODIMENTS

First Embodiment

Prior to explanation of an electric motor controller as one of features of the present embodiment, explanation will be made as to a series hybrid vehicle.

Figure 1:
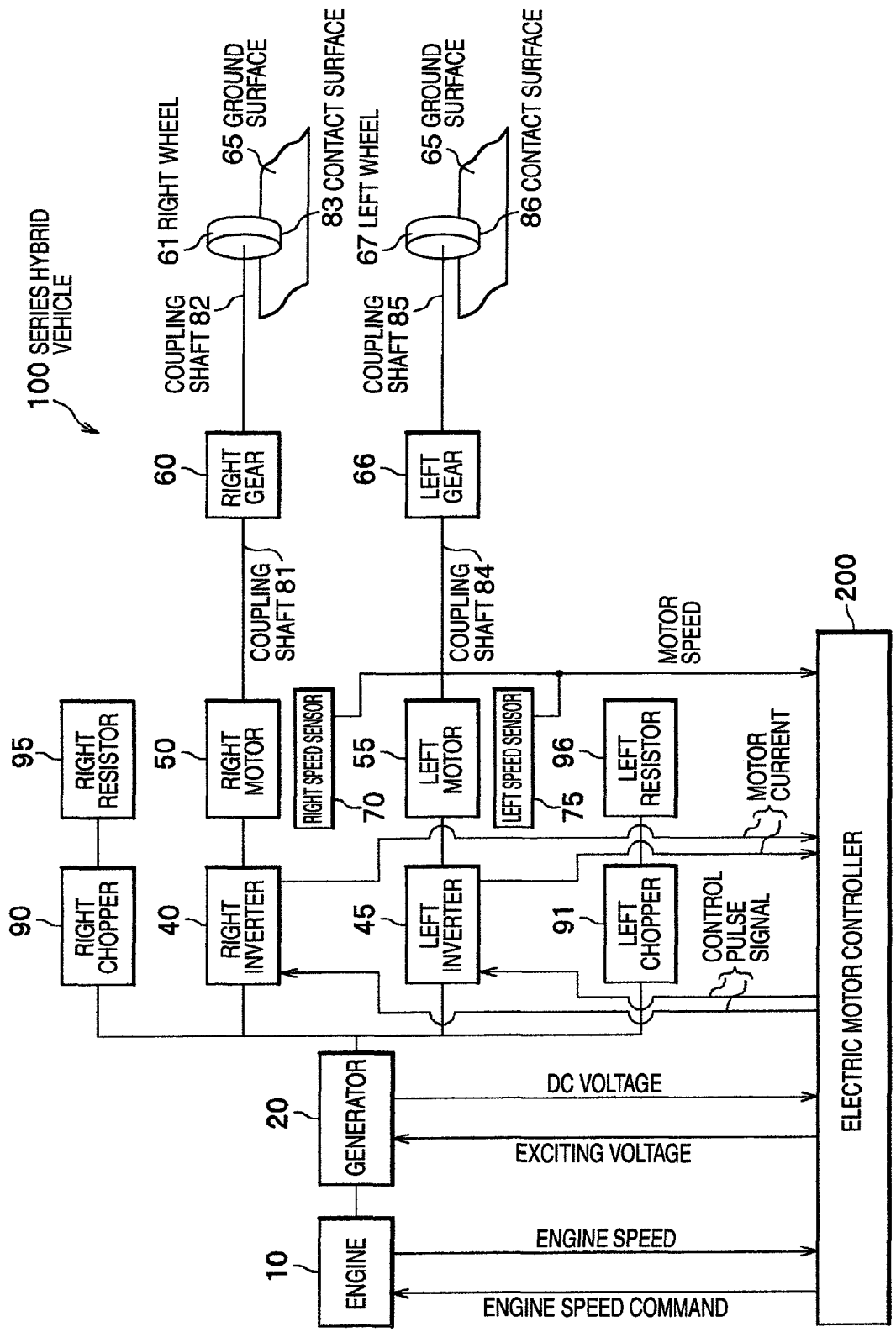
FIG. 1 shows an arrangement of a series hybrid vehicle in accordance with a first embodiment of the present invention.

In an arrangement of FIG. 1, a series hybrid vehicle 100 in accordance with the first embodiment of the present invention includes an engine 10 for inputting an engine speed command indicative of an amount of depression in an accelerator pedal (not shown) or in a brake pedal to be rotated at an engine speed based on the command, a generator 20 coupled to the engine 10 and having a rectifier, a right inverter 40 as a power converter for converting a DC voltage generated and rectified by the generator 20 to a rectangular wave voltage, a right motor 50 as an AC motor driven by the right inverter 40, a right gear 60 (planetary gear) directly coupled to the right motor 50, a right wheel 61 directly coupled to the right gear 60, and a motor controller 200 as a motor control device. In the illustrated example, the right inverter 40, the right motor 50, and the motor controller 200 form an electric motor control system.

Figure 2:
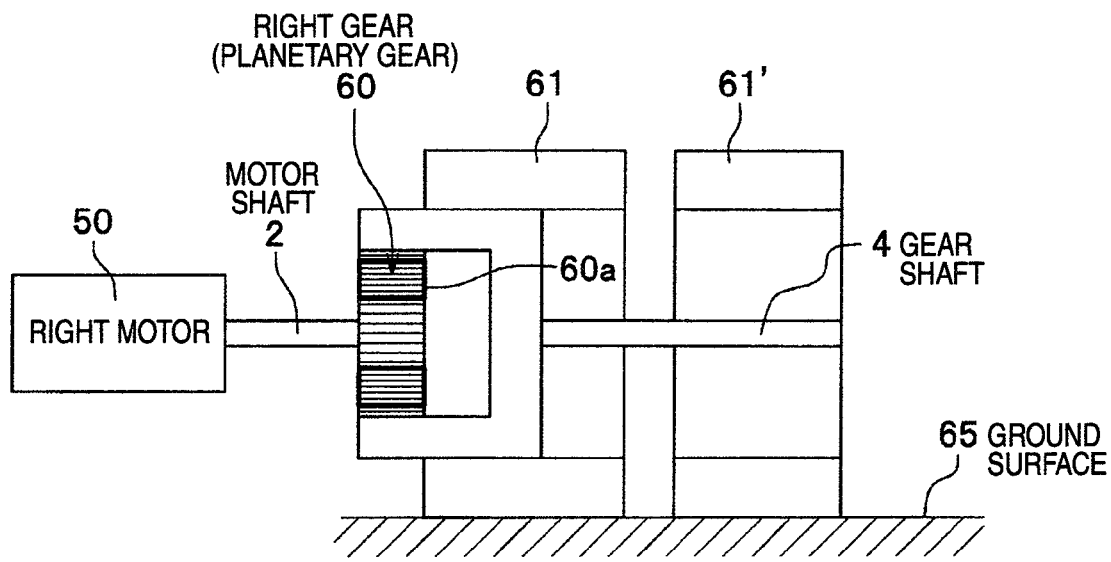
FIG. 2 shows a mechanism of the series hybrid vehicle ranging from an electric motor to wheels in the first embodiment of the invention.

FIG. 2 shows a mechanism when a driving force generated by the right motor 50 is transmitted to the right wheel 61 and then reaches a ground surface 65.

As shown in FIG. 2, the driving force of the right motor 50 is transmitted via a motor shaft 2 to a sun gear of the right gear (planetary gear) 60, a driving force of the right gear 60 is transmitted via an outer gear 60a of the right gear 60 and an gear shaft 4 to the right wheel 61, so that the vehicle is run by a rotational force applied to the right wheel 61 with a frictional resistance between the right wheel 61 and the ground surface 65. The wheels 61 and 61' form a twin wheel.

In other words, referring again to FIG. 1, the right motor 50 and the right gear 60 are intercoupled by a coupling shaft 81 corresponding to the motor shaft 2, the right gear 60 and the right wheel 61 are intercoupled by a coupling shaft 82, and the right wheel 61 receives a reaction from the ground surface 65 via a contact surface 83.

The engine 10 receives a speed command from the motor controller 200 in such a manner that the engine speed is controlled on the basis of an amount of depression in the accelerator pedal (not shown) or in the brake pedal (not shown). The engine 10 is arranged so that a detected engine speed is output to the motor controller 200.

When an exciting voltage is applied to a field winding of a rotor (not shown) of the generator 20 to rotate the rotor and to cause a magnetic flux to be interlinked with a coil of a stator (not shown), the generator 20 generates an AC power synchronized with a rotational angle in the stator coil wired and wound in 3-phase. The generator 20, which includes a 3-phase rectifier and a smoothing capacitor (not shown), converts the generated AC power to a DC power with 2000V in maximum voltage and outputs the DC power. The DC output voltage of the generator is regulated by the exciting voltage received from the motor controller 200 and by the speed of the rotor. The smoothing capacitor is intended to reduce a ripple voltage and has a capacitance of such a value that a load current rapidly reduces the voltage.

The generator 20 is arranged to control the exciting voltage. This is because, when the generator speed is low, reduction of the exciting voltage can restrict the exciting current within a predetermined range and thus prevent over-excitation. Further, the reduction of the exciting voltage reduces the generated voltage. Thus, even when the right inverter 40 is operated in a low speed region (e.g., below 25 Hz), an inverter loss can be reduced.

The right motor 50 is an induction motor for converting a 3-phase AC power to a rotational energy, and a right speed sensor 70 for detecting a motor speed is provided outside of the right motor. Since the right motor 50 is an induction motor, a slip takes place between a rotating magnetic field and the rotor, so that the frequency of the motor speed is different from the frequency (inverter frequency) of the motor applied voltage.

The right inverter 40 converts the received DC power to a 3-phase AC power to control the right motor 50 on the basis of a 3-phase control pulse signal Pu, Pv, Pw received from the motor controller 200. The DC voltage generated by the generator 20 regulates the amplitude of a pulse voltage applied to the right motor 50. The right inverter 40, which includes a 3-phase current sensor, outputs a motor current to the motor controller 200.

Figure 3:
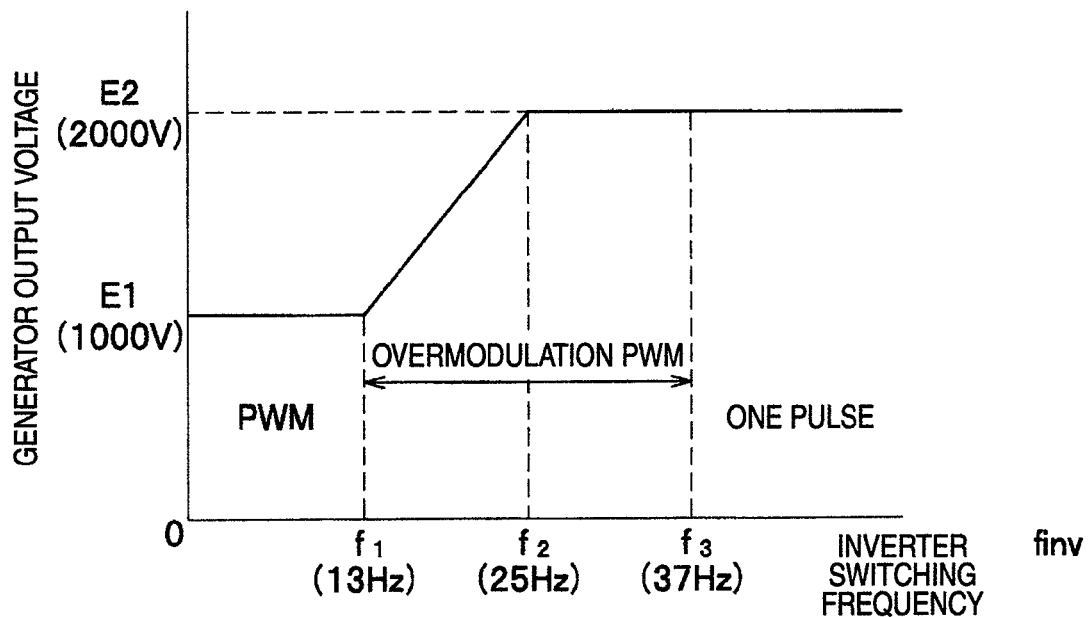
FIG. 3 shows a relation between inverter frequency and generator output voltage.

As shown in FIG. 3, when an inverter frequency finv (corresponding to the speed of the right motor 50) of the right inverter 40 is lower than a first predetermined frequency f1 (e.g., 13 Hz), the right inverter 40 performs PWM (pulse width modulation) control. When the inverter frequency finv is higher than a third predetermined frequency f3 (e.g., 37 Hz), on the other hand, the right inverter 40 performs one-pulse control. Between the first predetermined frequency f1 and the third predetermined frequency f3, the right inverter 40 performs such control as to smoothly link between PWM control such as over-modulation PWM and one-pulse control. In this example, one-pulse control refers to such control as to change an average voltage applied to the right motor 50 by making variable the pulse width only once at each of half positive and negative cycles in the period of the right inverter 40. Thus, with such one-pulse control, since a switching frequency in one period is smaller than that in the PWM control system, an inverter efficiency can be increased. When the inverter frequency is lower than the third predetermined frequency f3, execution of the one-pulse control makes a conduction time long, with the result that an over-current flows through the right motor 50.

When the inverter frequency of the right inverter 40 is lower than the third predetermined frequency f3 (e.g., 37 Hz), the d-axis magnetic flux (to be later exemplified by 270b in FIG. 4) is controlled to keep a constant value, and a torque current is controlled to also keep a constant value. An AC voltage amplitude necessary for keeping a d-axis magnetic flux $\phi d$ of the right motor 50 at a constant value is proportional to the inverter frequency finv. Thus, in a region when the inverter frequency finv is low, it is allowed to reduce a DC voltage necessary for generating the AC voltage applied to the right motor 50. In the region when the inverter frequency finv is low, an inverter loss becomes large due to the fact that a large torque current (q-axis current) flows upon user's request and the PWM control is performed to avoid an overcurrent. The inverter loss is proportional to a product of the DC voltage, the inverter current, and the switching frequency. In the region when the inverter frequency finv is low, however, the inverter loss is reduced by lowering the DC voltage.

That is, the motor controller 200 controls the engine speed in such a manner that, when the inverter frequency finv of the right inverter 40 is lower than the first predetermined frequency f1 (e.g., 13 Hz), the generator 20 outputs a low voltage E1 (e.g., 1000V or lower). When the inverter frequency finv is higher than a second predetermined frequency f2 (e.g., 25 Hz), the motor controller 200 controls the engine speed in such a manner that the generator 20 outputs a high voltage E2 (e.g., 2000V). When the inverter frequency is not lower than the first predetermined frequency f1 and not higher than the second predetermined frequency f2, the DC voltage is increased linearly from the low voltage E1 to the high voltage E2. With such an arrangement, the inverter loss is reduced for frequencies not higher than the second predetermined frequency f2. When the inverter frequency is higher than the third predetermined frequency f3, the right motor 50 perform the one-pulse control, and when the inverter frequency is not higher than the third predetermined frequency f3, the right motor 50 perform PWM control or overmodulation PWM control. As a result, no overcurrent will flow through the right motor 50.

Explanation will be made as to the maximum output operation of the system when the throttle opening is set at its maximum value (100%). When the throttle opening is lowered, the engine speed decreases and the DC output voltage of the generator 20 also decreases. When the throttle opening is fixed at a low degree (e.g., 20%), the operational change frequency will not vary except that the DC voltage of the system drops.

Connected to the generator 20 are a right chopper 90 and a right resistor 95. In such a series hybrid vehicle having no battery mounted thereon as in the present embodiment, the generator 20 always supplies a power necessary for driving the right motor 50 thereto in an acceleration mode. In a deceleration mode, the right motor 50 regenerates the kinetic energy of the vehicle and converts it to an electric energy. Since the electric energy is consumed by the right resistor 95 and the right resistor 95 in the regenerative mode, the wear of the mechanical components is less in a brake mode.

The series hybrid vehicle 100 includes the motor controller 200. On the basis of the motor speed detected by the right speed sensor 70, the 3-phase motor current detected by the right inverter 40, and a torque command Trq* (see FIG. 4); the motor controller 200 controls a torque generated by the right motor 50.

The series hybrid vehicle 100 is arranged so that right and left wheels are driven by the right and left motors. The series hybrid vehicle 100 further includes a left inverter 45, a left motor 55, a left gear 66, and a left wheel 67, which in turn are interlinked by a linkage shaft 84, a linkage shaft 85, and a contact surface 86 respectively. The series hybrid vehicle 100 also includes the right speed sensor 70 for detecting the speed of the right motor 50, a left speed sensor 75 for detecting the speed of the left motor 55, a left chopper 91, and a left resistor 96. The left inverter 45, the left motor 55, and the motor controller 200 may form an electric motor control system.

By referring to a block diagram of FIG. 4, explanation will next be made as to the functional arrangement of the motor controller 200.

The motor controller 200 generates the 3-phase control pulse signal Pu, Pv, Pw to be applied to the right inverter 40 (see FIG. 1) on the basis of a motor speed frfb, motor currents Iu, Iv, Iw, the torque command Trq*, and a DC voltage predicted value Edc*(pre). In this connection, the motor speed frfb is expressed by a value corresponding to a conversion from mechanical angle to electrical angle. The motor controller 200 performs dq vector control by resolving the motor current and the motor voltage into a magnetic flux axis component (d-axis component) and a torque axis component (q-axis component) electrically perpendicular thereto.

In this case, an LPFb 265 for creating a d-axis magnetic flux estimated value $\phi d*(obs)$ from the d-axis magnetic flux command $\phi d*$ is one of features in the arrangement of the present embodiment. The motor controller considers an inherent response of the right motor 50 from the d-axis magnetic flux command $\phi d*$, and estimates a d-axis magnetic flux $\phi d$ not observed but actually generated in the right motor 50 as the d-axis magnetic flux estimated value $\phi d*(obs)$.

The DC voltage predicted value Edc*(pre) is one of features in the arrangement of the present embodiment. The DC voltage predicted value Edc*(pre) is an predicted value of a future change in the DC voltage Edc of the generator 20 (see FIG. 1). The d-axis magnetic flux command $\phi d*$ is expressed by a function of the DC voltage Edc and the inverter frequency finv. The d-axis magnetic flux command $\phi d*$ is influenced by a change in the DC voltage Edc more largely than a change in the inverter frequency finv. The DC voltage is varied with response delays in the speeds of the engine 10 and the generator 20 and with a response delay of the generator voltage control with respect to a throttle opening change as a start point. However, the motor controller 200 predicts the DC voltage Edc after passage of a predetermined time (e.g., 1.3 seconds later) with the throttle opening change as the start point to perform motor control.

The motor controller 200 also includes a pulse generator 210, a 3-phase/2-axis converter 215, a modulation rate calculator 220, a dq-axis/polar coordinate transformer 225, a VdVq voltage commander 230, a frequency/phase converter 235, a torque/current converter 240, a q-axis ACR 245, a slip frequency command calculator 250, a 1/M calculator 255, an LPFa 260, a magnetic flux command calculator 270, a DC voltage predictor 400, and adders 281, 282, 283. The functions of the respective sections are implemented by a computer having a CPU, a ROM and a RAM and by a program.

The dq-axis/polar coordinate transformer 225 converts a q-axis command voltage Vqm and a d-axis command voltage Vdm to a voltage amplitude V1dq and a voltage phase δdq according to equations (1) and (2) which follow.

$$\delta dq = \tan^{-1}(Vqm/Vdm) \quad (1)$$

$$V1dq = \sqrt{(Vdm^2 + Vqm^2)} \quad (2)$$

The pulse generator 210 inputs a signal based on the voltage amplitude V1dq and a signal based on the voltage phase δdq, and outputs the 3-phase control pulse signal Pu, Pv, Pw to control the right inverter 40 (see FIG. 1). At this time, the voltage amplitude V1dq is used to cause the modulation rate calculator 220 to calculate a ratio between the voltage amplitude V1dq and the DC voltage predicted value Edc*(pre), and applies the calculated ratio to the pulse generator 210 in the form of a modulation rate V1kh as its calculation result. A reference coordinate phase θnow, the voltage phase δdq, and a phase angle of π/2 are added in the adder 283 to form an inverter phase θinv, which in turn is input to the pulse generator 210.

The pulse generator 210 also compares the value of a triangle wave signal based on the phase signal (reference coordinate phase θnow+voltage phase δdq+π/2) added in the adder 283 with the value of the voltage amplitude V1dq to generate a PWM control pulse signal, and outputs it as the control pulse signal Pu, Pv, Pw. When the modulation rate V1kh exceeds a predetermined value, the pulse generator 210 generates a one-pulse control signal of a length corresponding to the inverter phase θinv, and outputs it as the control pulse signal Pu, Pv, Pw.

The frequency/phase converter 235 converts the inverter frequency finv* to the reference coordinate phase θnow by multiplying finv* by 2π and integrating it. The inverter frequency finv* is obtained by adding the motor speed frfb and a slip frequency command slip* in the adder 282.

The 3-phase/2-axis converter 215 performs dq vector conversion to convert the motor currents Iu, Iv, Iw flowing through the right motor 50 (see FIG. 1) to a d-axis current Idf and a d-axis current Iqf according to equations (3) to (6) which follow.

$$I\alpha f = 2/3 \cdot Iu - 1/3 \cdot Iv - 1/3 \cdot Iw \quad (3)$$

$$I\beta f = 1/\sqrt{3 \cdot (Iv - Iw)} \quad (4)$$

$$Idf = +I\alpha f \cdot \cos(\theta now) + I\beta f \cdot \sin(\theta now) \quad (5)$$

$$Iqf = -I\alpha f \cdot \sin(\theta now) + I\beta f \cdot \cos(\theta now) \quad (6)$$

The torque/current converter 240 converts the torque command Trq* to a q-axis current command Iq* on the basis of the d-axis magnetic flux estimated value φd*(obs) according to an equation (7) which follows.

$$Iq^* = Trq^* / (K \cdot d^*(obs)) \quad (7)$$

In this case, the d-axis magnetic flux estimated value φd*(obs) is obtained by passing the d-axis magnetic flux command φd* through the LPFb 265, the d-axis magnetic flux command φd* is a function of the DC voltage predicted value Edc*(pre) and the inverter frequency finv*, and the magnetic flux command calculator 270 calculates the d-axis magnetic flux command φd* by referring to a table. For example, as shown by a table 270b in FIG. 5, the magnetic flux command calculator 270 is set to reduce a magnetic flux in such a manner that the magnetic flux becomes constant in a low speed region, and excitation is weakened to make the amplitude of the voltage applied to the motor constant in a high speed region. In this connection, the LPFb 265 is a filter as a first-order lag element having a response time constant τd (e.g., about 1.3 seconds) of the d-axis magnetic flux φd not shown.

Figure 5:
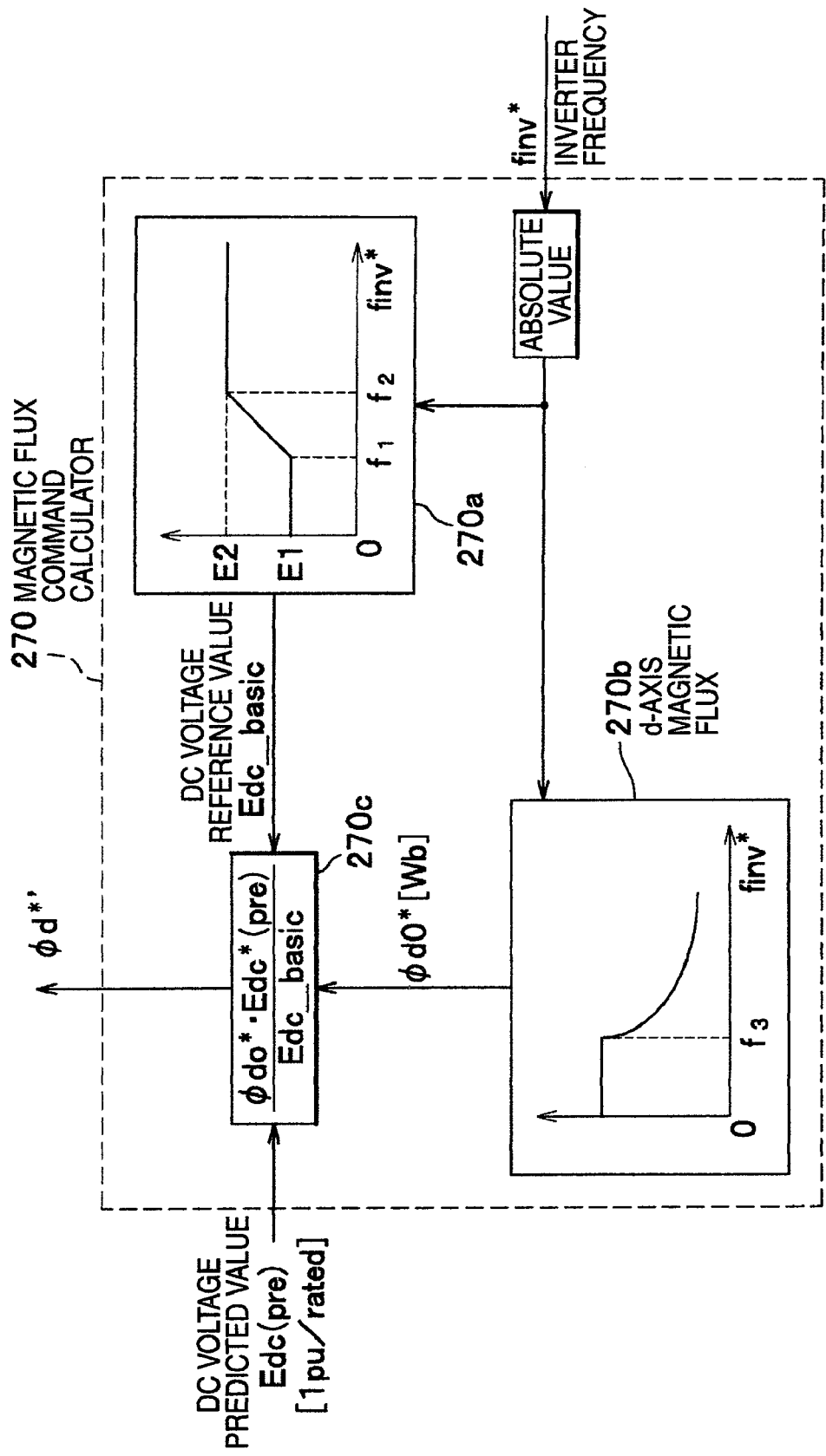
FIG. 5 shows a configuration of a magnetic flux command calculator.

The magnetic flux command calculator 270 calculates the d-axis magnetic flux command Td* on the basis of the DC voltage predicted value Edc*(pre) and the inverter frequency finv* as the frequency of the control pulse signal Pu, Pv, Pw. As shown in FIG. 5, the magnetic flux command calculator 270 calculates a DC voltage reference value Edc_basic and a d-axis magnetic flux reference value φd0* on the basis of the absolute value of the inverter frequency finv* by referring to tables 270a and 270b. Further, a calculator 270c calculates the d-axis magnetic flux command φd* from the DC voltage reference value Edc_basic and the d-axis magnetic flux reference value φd0* according to an equation (8) which follows. In this case, the DC voltage predicted value Edc*(pre) is expressed in units of 1 pu/rated (100%/rated).

$$\phi d^* = \phi d0^* \cdot Edc^*(pre)/Edc\_basic \quad (8)$$

The table 270a is set so that, when the absolute value of the inverter frequency finv* is lower than the predetermined frequency f1, the DC voltage reference value Edc_basic becomes the predetermined voltage E1 (e.g., 1000V), and when the absolute value of the inverter frequency finv* is higher than the predetermined frequency f2, the DC voltage reference value Edc_basic becomes the predetermined voltage E2 (e.g., 2000V). The table 270a is also set so that, when the absolute value of the inverter frequency finv* is higher than the predetermined frequency f1 and lower than the predetermined frequency f2, the DC voltage reference value Edc_basic varies linearly between the predetermined voltage E1 and the predetermined voltage E2.

The table 270b is set so that, when the absolute value of the inverter frequency finv* is lower than a predetermined frequency f4, the d-axis magnetic flux command φd0* has a constant value, and when the inverter frequency finv* is higher than the predetermined frequency f4, the d-axis magnetic flux command φd0* is gradually attenuated. As a result, when the inverter frequency finv* is lower than the predetermined frequency f4, the motor can be driven with a constant magnetic flux; whereas, when the inverter frequency finv* is higher than the predetermined frequency f4, excitation is weakened so that the motor can be driven with a constant level of the amplitude of the voltage applied to the motor.

The d-axis magnetic flux command φd* as the output of the magnetic flux command calculator 270 is converted to a d-axis current command Id* through the 1/M calculator 255, and then applied to the VdVq voltage commander 230. In this case, the 1/M calculator 255 is such a calculator as to have a function of dividing the input signal by a mutual inductance M of an induction motor. Further, the d-axis magnetic flux command φd* is passed through the LPFb 265 to be converted to the d-axis magnetic flux estimated value φd*(obs) as an estimated value of the d-axis magnetic flux φd actually generated in the right motor 50, and then sent to the torque/current converter 240, the slip frequency command calculator 250 and the VdVq voltage commander 230.

The q-axis ACR 245 performs proportional integral control (PI control) on the basis of a difference between the d-axis current Iqf as a fundamental wave component extracted by the LPFa 260 and the q-axis current command Iq*, and the difference is calculated in the adder 281. Connected to the output of the q-axis ACR 245 is a limiter 247, which in turn outputs a q-axis current command Iqv.

The VdVq voltage commander 230 receives the q-axis current command Iqv, the d-axis magnetic flux command φd*, the d-axis current command Id* obtained by converting the d-axis magnetic flux command φd* through the 1/M calculator 255, and the inverter frequency finv*; and generates the q-axis command voltage Vqm and the d-axis command voltage Vdm according to equations (9) and (10) which follow.

$$Vqm = R\sigma \cdot Iqv + 2\pi finv^* \cdot L\sigma \cdot Id^* + 2\pi frfb \cdot M/L2 \cdot \phi d^* \quad (9)$$

$$Vd^* = R\sigma \cdot Id^* - 2\pi finv^* \cdot L\sigma \cdot Iqv - M/(T2-L2) \cdot \phi d^* \quad (10)$$

In these equations, $R\sigma = R1 + R2'$, $L\sigma = L1 - M^2/L2$, $R\sigma$ denotes a first-order conversion resistance, R1 denotes a first order resistance, R2' a first-order conversion second-order resistance, Lσ a first-order conversion leakage inductance, M a mutual inductance, L1 a first-order self inductance, L2 a second-order self inductance, T2 a second-order time constant (T2=L2/R2), R2 a second-order resistance. These constants are equivalent circuit parameters for an inductor motor or the like.

The slip frequency command calculator 250 calculates the slip frequency command slip* from the d-axis magnetic flux estimated value φd*(obs) and the q-axis current command Iqv according to an equation (11) which follows.

$$slip^* = K \cdot Iqv/\phi d^*(obs) \quad (11)$$

In this equation, K denotes a constant.

Figure 6:
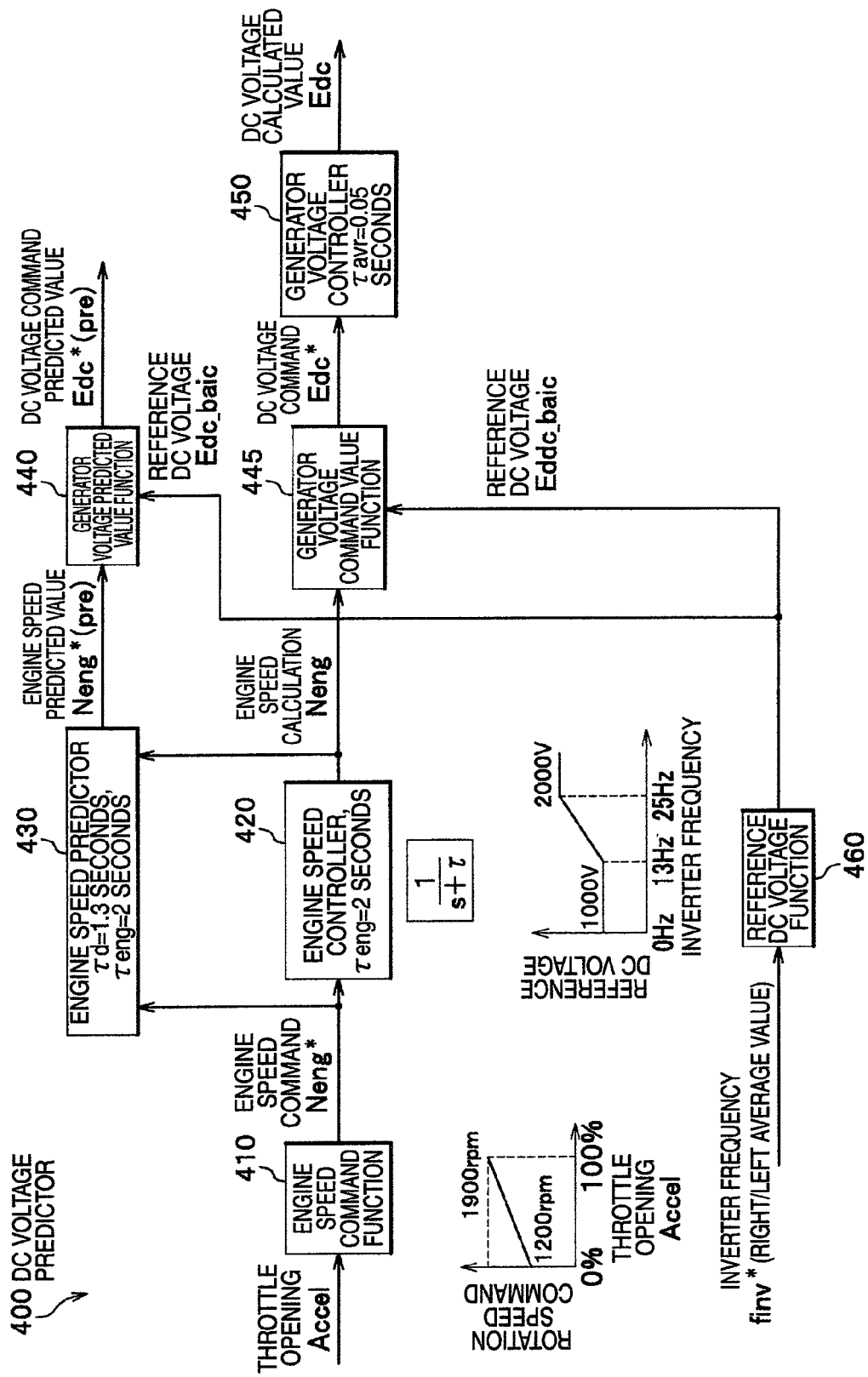
FIG. 6 shows a configuration of a DC voltage predictor.

Explanation will then be made as to a method of controlling the DC voltage Edc in the prior art by referring to FIG. 6. A throttle opening Accel is input to an engine speed command function 410 to vary an engine speed command Neng*. An engine speed controller 420 is operated to vary an engine speed command Neng with a predetermined response delay time τeng (e.g., 2 seconds). The inverter frequency finv*, on the other hand, is input to a reference DC voltage function 460 to calculate the DC voltage reference value Edc_basic. This function itself is substantially the same as the table 270a in FIG. 5, but different therefrom in that the inverter frequency finv* as its input corresponds to the value of one side in FIG. 5 but to an average value of right and left sides in FIG. 6. A generator voltage command value function 445 inputs the engine speed command Neng and the DC voltage reference value Edc_basic, and calculates a DC voltage Edc*. The DC voltage Edc* is calculated using a rated engine speed value Neng(typ) according to an equation (12) which follows.

$$Edc^* = Edc\_basic \times Neng/Neng(typ) \quad (12)$$

A generator voltage controller 450 inputs the DC voltage Edc* and outputs a varied DC voltage detection value Edc with a predetermined response delay time τavr (e.g., 0.05 seconds). In the prior art, a DC voltage for use in the magnetic flux command calculator 270 uses the DC voltage Edc or the DC voltage Edc* in place of the DC voltage predicted value Edc (pre).

By referring to FIG. 6, explanation will next be made as to the DC voltage predictor 400 (see FIG. 4) which calculates the DC voltage predicted value Edc* (pre) as one of features of the present embodiment. The DC voltage predictor 400 includes the engine speed command function 410, the engine speed controller 420, an engine speed predictor 430, a generator voltage predicted value function 440, a generator voltage command value function 445, the generator voltage controller 450, and the reference DC voltage function 460.

The DC voltage Edc is expressed by a function of the throttle opening Accel and the inverter frequency finv*, and largely influenced by the throttle opening Accel. This is, from the viewpoint that an output is largely delayed with respect to an input as an response, because of the intervention of the engine speed controller 420 having the response delay time τeng. To avoid this, a mechanism for predicting an engine speed while taking the response delay in the processing of the throttle opening Accel into account is considered. A future time to be predicted is set as a target time after passage of a response time constant time (about 1.3 seconds) of the magnetic flux φd. This is intended to cancel out the influence of the response time constant of the excitation magnetic flux φd by varying the d-axis magnetic flux command φd* by the same time constant as fast as possible. In other words, in the motor control method of the present embodiment, pulse width control is carried out by predicting a change in the DC voltage for regulating the amplitude of the AC voltage applied to the AC motor.

The engine speed command function 410, when the throttle opening Accel is varied from 0% to 100%, changes the engine speed command Neng* from 1200 rpm to 1900 rpm. The engine speed controller 420 calculates an engine speed based on the engine speed command Neng*, and the output of the engine speed controller 420 is expressed by the engine speed command Neng. More specifically, the engine speed controller 420 calculates a first-order lag (1/(s+τeng)) of the response delay time τeng. In this case, the predetermined response delay time τeng is 2 seconds.

The engine speed predictor 430 inputs the engine speed command value Neng* and the engine speed command Neng, and calculates the a future engine speed predicted value Neng*(pre) with a response time constant τd of the excitation magnetic flux φd (of about 1.3 seconds). Since the predictor simulates the first-order lag of the engine speed controller 420, the predicted value is calculated by an equation (13) which follows.

$$Neng^*(pre) = Neng + (Neng^* - Neng) \cdot \{1 - e(-\tau d/\tau eng)\} \quad (13)$$

The reference DC voltage function 460, which is a table for calculating the reference value Edc_basic from the inverter frequency finv*, outputs a value of 1000V in a range of the inverter frequency finv* from 0 Hz to 13 Hz, outputs a value of 2000V in a range not lower than 25 Hz, and outputs a voltage linearly varying in a range of from 1000V to 2000V in a inverter frequency range of from 13 hz to 25 hz.

The generator voltage predicted value function 440 inputs the future engine speed predicted value Neng*(pre) and the DC voltage reference value Edc_basic, and outputs a DC voltage predicted value Edc*(pre). The predicted value is calculated according to an equation (14) which follows.

$$Edc^*(pre) = Edc\_basic \times Neng^*(pre)/Neng(typ) \quad (14)$$

In this equation, Neng(type) is, for example, 1900 rpm.

The generator voltage command value function 445 converts the engine speed calculated vale Neng to the DC voltage command Edc*, and the function is more specifically similar to the equation (14).

Explanation will next be made as to the general operation of the series hybrid vehicle 100.

Figure 7A:
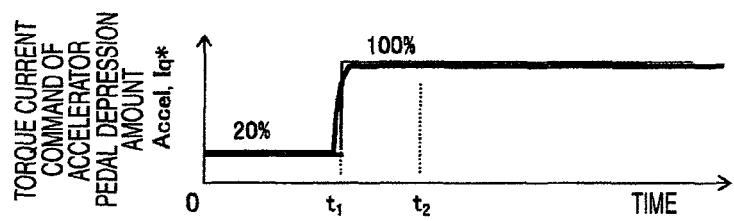
FIGS. 7A to 7F show diagrams for explaining the general operation of the series hybrid vehicle of the first embodiment.
Figure 7B:
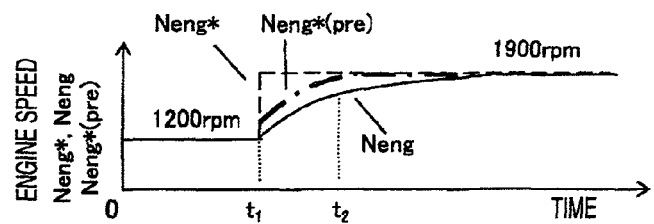

As shown in FIG. 7A, the accelerator pedal (not shown) is depressed and an amount of accelerator pedal depression stepwise varies from 20% to 100% at a time t1. The torque current command value (q-axis current command value Iq*) is varied nearly at the same time. As shown in FIG. 7B, before the time t1, the engine 10 is driven at the engine speed Neng of, e.g., 12000 rpm, the engine speed command Neng* changes to 19000 rpm and the engine speed Neng increases with an first-order lag at the time t1. And the engine 10 soon reaches a constant speed of 19000 rpm. The engine speed predicted value Neng*(pre) is varied faster by the time τd (about 1.3 seconds) than the actual engine speed Neng.

Figure 7C:
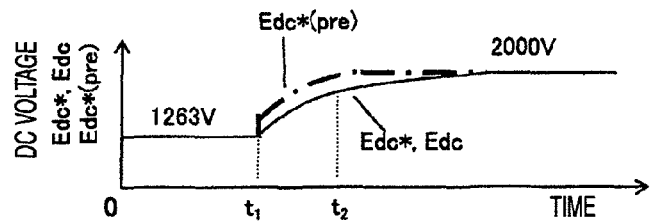

FIG. 7C shows a change in the DC voltage. Before the time t1, a DC voltage Edc* of 1263V is output in response to an engine speed of 1200 rpm, and the DC voltage Edc is also kept at 1263V. After the time t1, the DC voltage Edc gradually increases with the first-order lag in proportion to the engine speed Neng. The DC voltage predicted value Edc*(pre) varies faster by the time τd (about 1.3 seconds) than the actual DC voltage Edc.

Figure 7D:
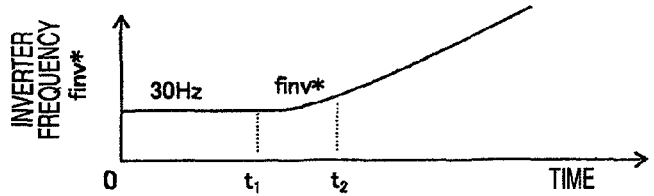

FIG. 7D shows a variation in the inverter frequency finv*. Before the time t1, a balance is established between the motor torque and the ground surface resistance and the inverter frequency finv* does not vary buy is kept at a constant level. After the time t1, the motor torque is increased and thus the inverter frequency finv* gradually increases.

Figure 7E:
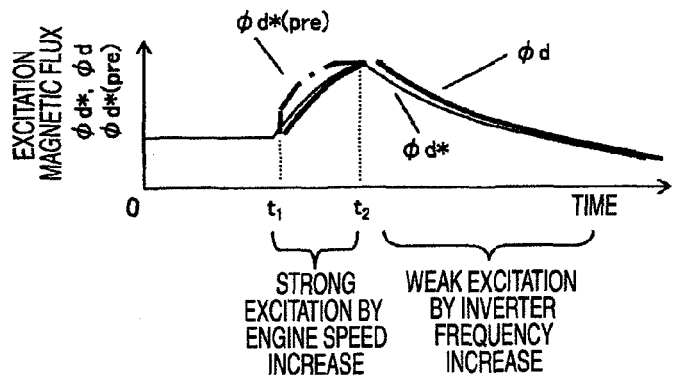

FIG. 7E shows a variation in the excitation magnetic flux φd of the right motor 50. Let pay attention first to the excitation magnetic flux command φd*. After the time t1, the DC voltage Edc increases (see FIG. 7C) and thus the d-axis magnetic flux command φd* is also increased. Since this causes an increase of the motor torque Trq* (see FIG. 7F), the inverter frequency finv* gradually increases and the weak excitation characteristic causes decrease of the excitation magnetic flux command φd*. At a time t2, the superiority between the increase and decrease factors is inverted and the excitation magnetic flux command φd* actually starts to gradually decrease.

A change in the excitation magnetic flux predicted value φd*(pre) directly causes a change of the q-axis voltage command Vqm, changing the motor voltage amplitude V1dq. Due to the response delay time constant τd (about 1.3 seconds) of the motor exciting circuit, the excitation magnetic flux φd actually generated within the motor is varied later by the response delay time constant τd than the excitation magnetic flux predicted value φd*(pre).

With regard to only the course of the DC voltage change, the excitation magnetic flux predicted value φd*(pre) is varied faster by the response delay time constant τd than the excitation magnetic flux command value φd*. For this reason, with regard to only the course of the DC voltage change, the excitation magnetic flux command φd* and the excitation magnetic flux φd behave in the same manner. In the weak excitation characteristic region involved by the increase of the inverter frequency, the excitation magnetic flux command φd* does not coincides with the excitation magnetic flux pd. However, since the change of the excitation magnetic flux command φd* is slow, a deviation between the excitation magnetic flux command φd* and the excitation magnetic flux φd is small.

Figure 7F:
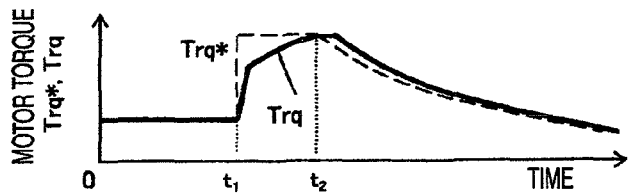

FIG. 7F shows a variation in the torque Trq of the motor. The torque Trq is proportional to a product of the excitation magnetic flux φd and the q-axis current Iq. In the prior art, however, in a time duration from the time t1 to the time t2 having a large deviation between the excitation magnetic flux command φd* and the actual excitation magnetic flux φd, since the deviation between the excitation magnetic flux command φd* and the excitation magnetic flux φd can be made small, the torque Trq can easily follow up the torque command Trq*.

Second Embodiment

In the first embodiment, the DC voltage predicted value Edc*(pre) has been calculated using the future engine speed predicted value Neng*(pre), but the follow-up performance of the weak excitation characteristic involved by the change of the inverter frequency finv has not been improved. In the second embodiment, a DC voltage predicted value Edc*(pre) is further calculated using an inverter frequency predicted value finv*(pre). The inverter frequency predicted value finv*(pre) can be calculated using an observer. Other arrangement is the same as the first embodiment.

Figure 4:
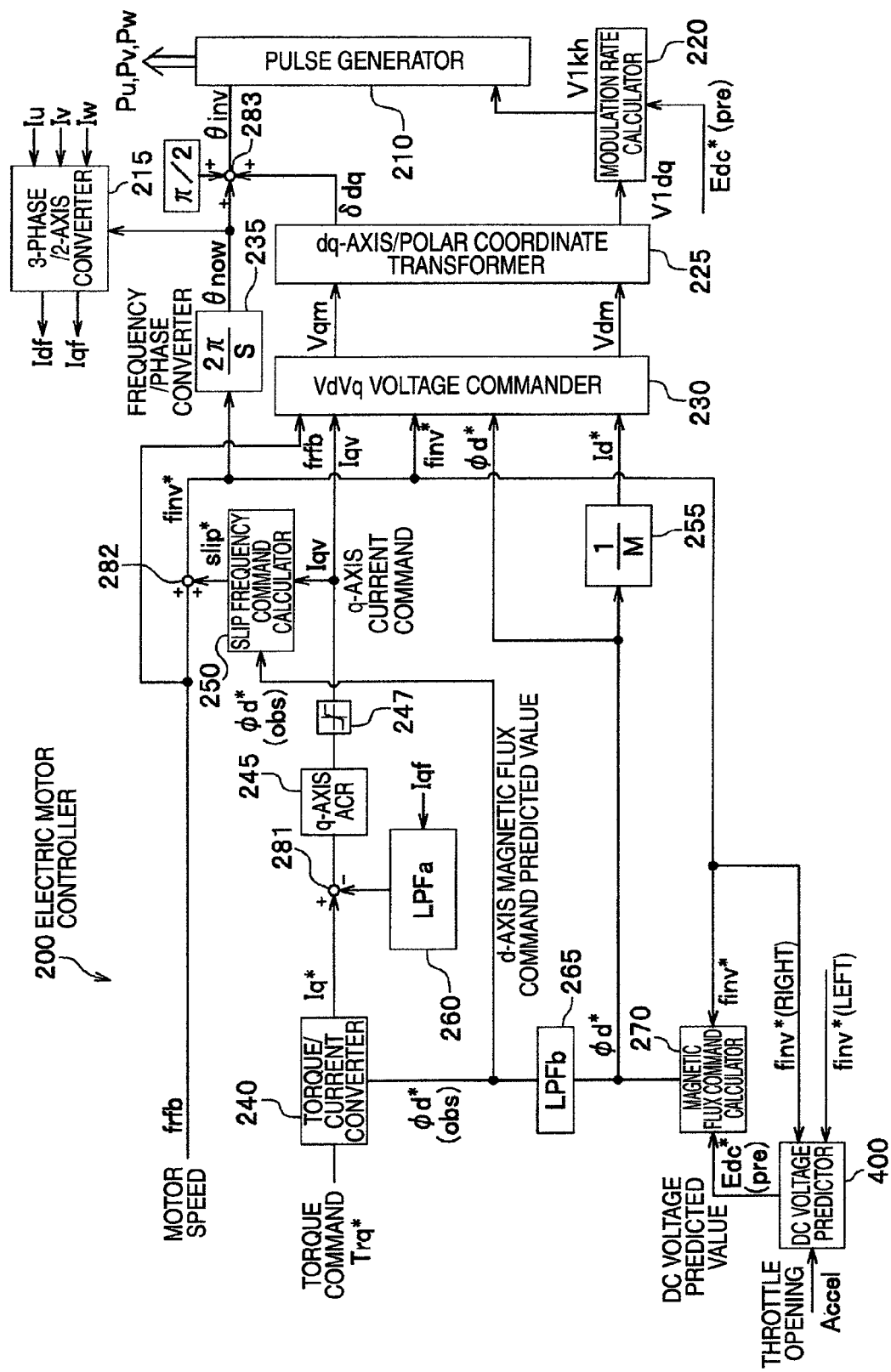
FIG. 4 shows a block diagram of a functional arrangement of an electric motor controller.
Figure 8:
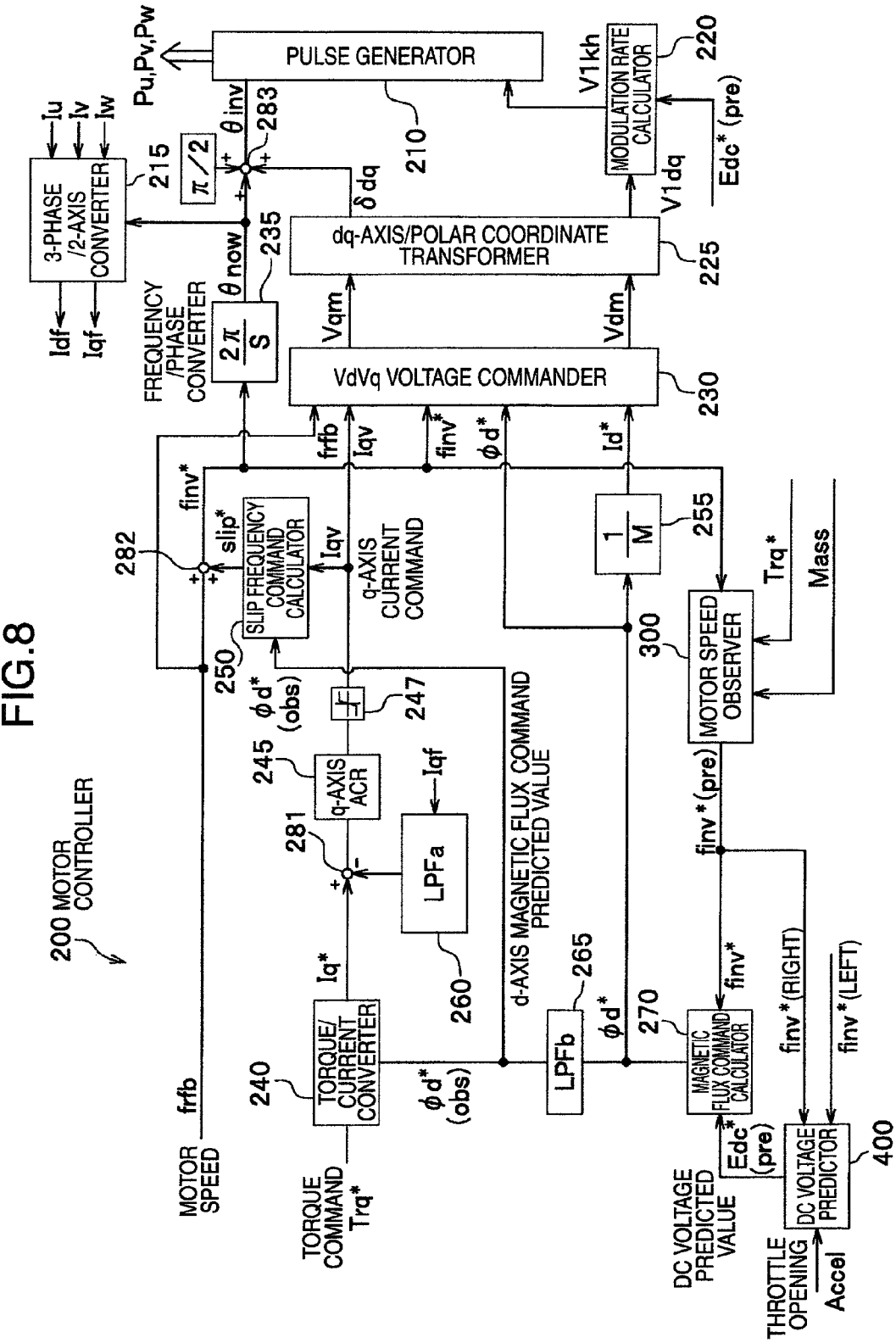
FIG. 8 shows a block diagram of a functional arrangement of an electric motor controller in a second embodiment of the invention.
Figure 9:
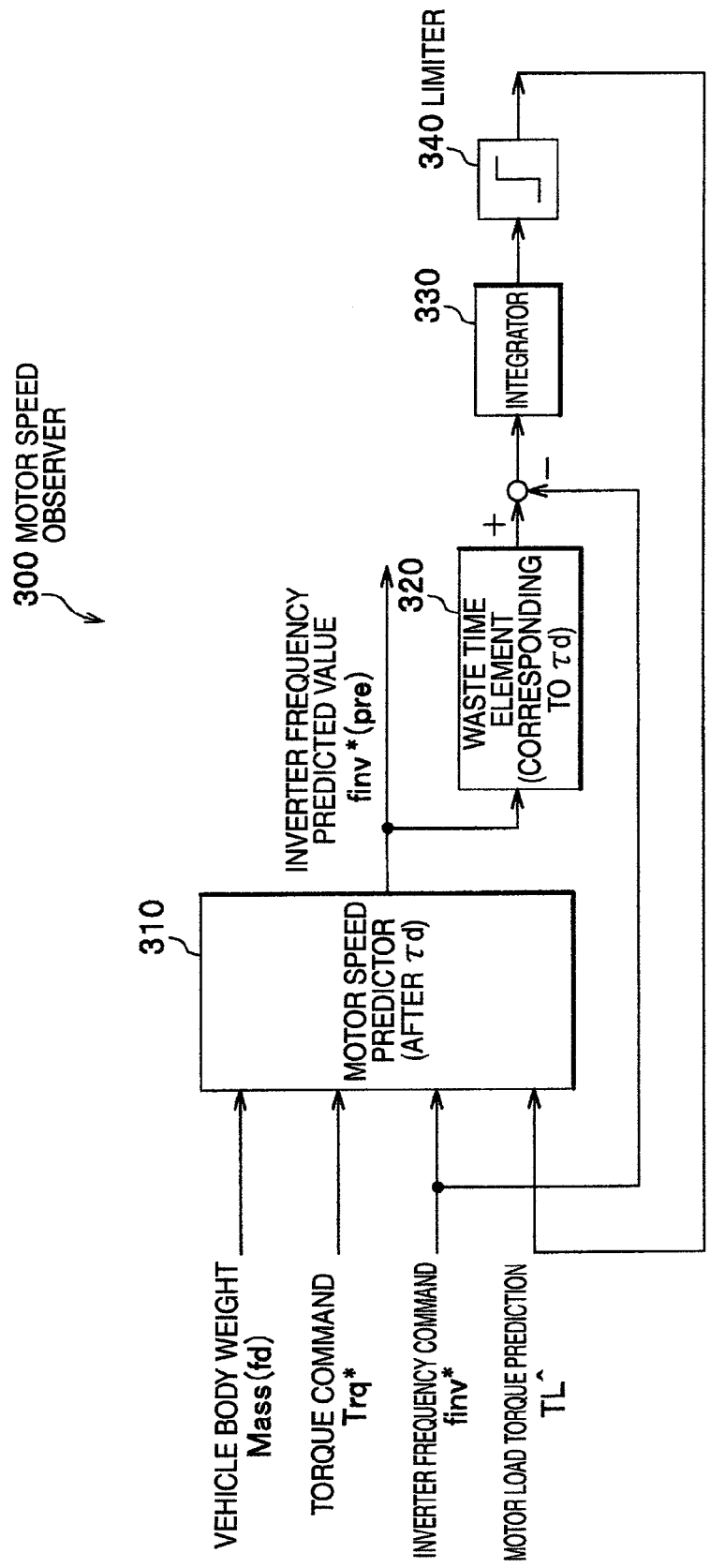
FIG. 9 shows an arrangement of a motor speed observer in the second embodiment.

In an arrangement of FIG. 8, the inverter frequency finv* applied to the magnetic flux command calculator 270 and the DC voltage predictor 400 is different from FIG. 4 in that a motor speed observer 300 calculates the inverter frequency finv*. The motor speed observer 300 inputs a vehicle body weight Mass(fb), the torque command Trq*, and the motor speed command value finv*. The motor speed observer 300 includes a motor speed predictor 310, a waste time element 320, an integrator 330, and a limiter 340. These functions are implemented by a computer having a CPU, a ROM and a RAM not shown and by a program.

A motor drive equation is shown by an equation (15) which follows. In the equation, TE denotes a motor torque [Nm], TL denotes a motor load torque [Nm], Jm denotes a motor inertia (kgm², and ωr denotes a motor mechanical angular velocity [rad/s].

$$TE-TL=Jm \cdot d\omega r/dt \qquad (15)$$

The motor torque TE is regarded as the torque command Trq* of the motor controller. The motor inertia Jm is regarded as a value proportional to the vehicle body weight Mass. The motor mechanical angular velocity ωr is regarded as a value proportional to the inverter frequency finv*. The motor load torque TL is a quantity varying from moment to moment with changes in the frictional coefficient of the road surface and in the tilt of the road surface.

The equation (15) is reduced to calculate a motor mechanical angular velocity ωr(t) after passage of a time t (seconds) from time 0.

$$\omega r(t)=\omega r(0)+1/Jm \cdot \int (TE-TL)dt \qquad (16)$$

From this equation, a value after passage of a time t (=τd (motor excitation time constant: 1.3 seconds)) is found as follows.

$$finv^*(\tau d)=finv^*(0)+A/\text{Mass} \cdot \int (Trq^*-TL)dt \qquad (17)$$

The motor speed predictor 310 inputs the vehicle body weight Mass(fb), the torque command Trq*, the motor speed command value finv*, and a motor load torque predicted value TL^ to be explained later; and outputs a motor speed predicted value finv*(pre) after passage of the response time constant τd of the right motor 50. The waste time element 320 delays the motor speed predicted value finv*(pre) by the time id, and then calculates a deviation from the motor speed finv* at the current time. The deviation is regarded as generated by the change of the motor load torque, the deviation is stored in the integrator 330 to modify the motor load torque predicted value TL^.

Explanation will then be made as to the general operation of the series hybrid vehicle 100.

Figure 10A:
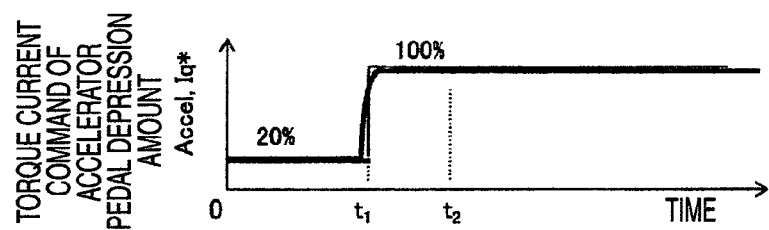
FIGS. 10A to 10F show diagrams for explaining the general operation of a series hybrid vehicle in accordance with the second embodiment.
Figure 10B:
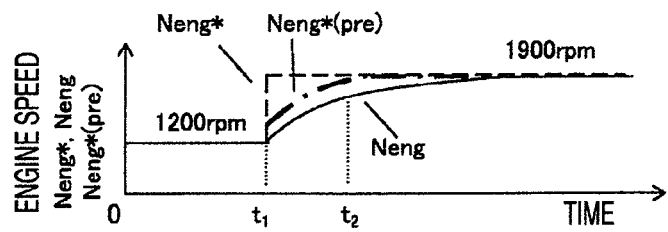
Figure 10C:
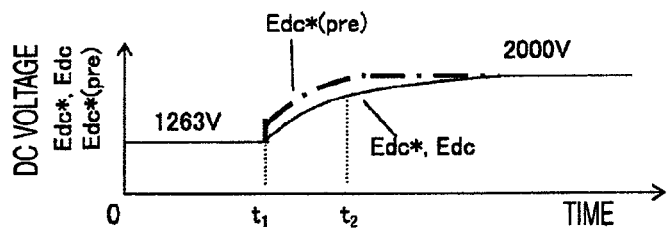
Figure 10D:
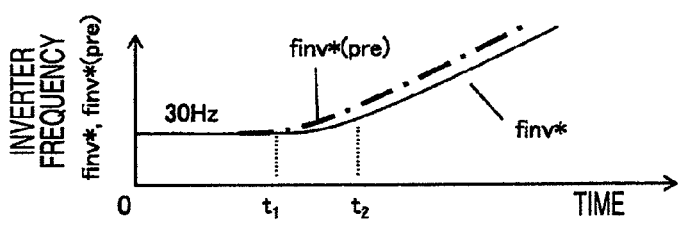
Figure 10E:
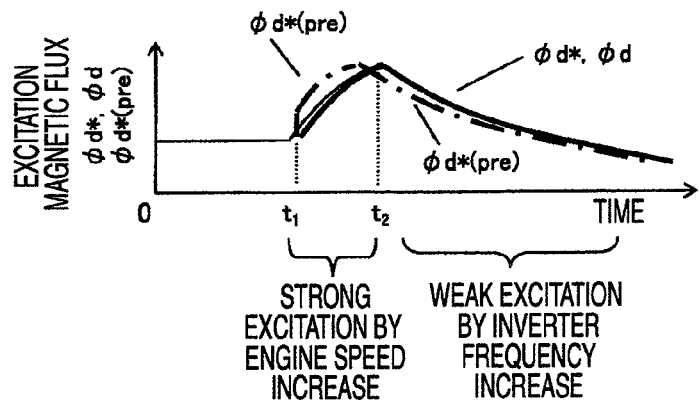
Figure 10F:
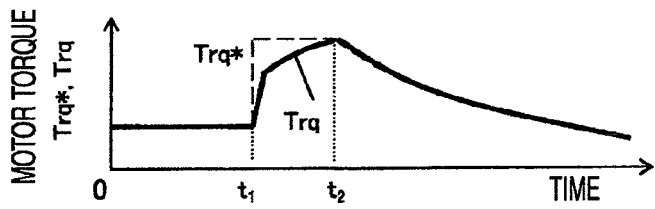

Similarly to the first embodiment, the operation of the series hybrid vehicle is shown by FIGS. 10A to 10F. In FIG. 10D, in particular, a characteristic of the motor speed predicted value finv*(pre) is shown.

MODIFICATIONS

The present invention is not limited to the foregoing embodiments but may be varied in such manners as shown below.

(1) Although no battery is provided between the generator 20 and the right and left inverters 40, 45 in the foregoing embodiments, such a battery may be employed if necessary. In this case, when bidirectional converters (power converters) are used for the right and left inverters 40, 45, a power generated by braking the right and left motors 50, 55 is regenerated in the battery.

(2) Although the induction motor has been used in the foregoing embodiments, another AC motor such as a synchronous motor may be employed. In this case, slip frequency is substantially ignored.

(3) Though the rectifier and the smoothing capacitor have been built in the generator 20 in the foregoing embodiments, the rectifier and the capacitor may be provided outside the generator. In this case, the generator is regarded as including the rectifier and the smoothing capacitor provided outside the generator. The generator 20 outputs a voltage of maximum 2000V in the foregoing embodiments. However, the generator 20 may be arranged to output the voltage of 2000V via a power converter.

(4) In the foregoing embodiment, the d-axis magnetic flux command is varied faster by the excitation time constant of the motor using the DC voltage predicted value or the like. However, it is not always required to vary the d-axis magnetic flux command faster. In the latter case, a transient offset takes place between the d-axis magnetic flux command and the actual d-axis magnetic flux. Since the torque current command (q-axis component) is generated by dividing the torque command by the d-axis magnetic flux predicted value, however, the motor torque follows up the torque command value. Since the torque current command (q-axis component) is restricted not to exceed a limit however, a torque may transiently decrease in some cases.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An electric motor control system comprising:
a generator;
an AC motor;
a power converter for driving said AC motor using a DC voltage output from said generator; and
an electric motor controller for controlling said power converter,
wherein said motor controller estimates a magnetic flux including a magnetic flux axis component by using a DC voltage predicted value predicting a change in said DC voltage, determines a current command based on a torque command and said estimated magnetic flux, and controls said power converter based on said current command.

2. An electric motor control system according to claim 1, wherein
said electric motor controller performs dq vector control by resolving any one or both of a current of said AC motor and a voltage thereof into a magnetic flux axis component and a torque axis component perpendicular to said magnetic flux axis component, and calculates said magnetic flux axis component using a predicted value of said DC voltage.

3. An electric motor control system according to claim 1, wherein
said electric motor controller, using current input and output values of at least one of circuit elements or control elements for generating the DC voltage which has a longer response time constant, calculates an output predicted value of the element having the longer response time constant after passage of a predetermined time, and calculates a predicted value of said DC voltage using the calculated output predicted value.

4. An electric motor control system according to claim 1, wherein
said electric motor control system is mounted in a series hybrid vehicle,
said electric motor controller further includes a magnetic flux command calculator for calculating a magnetic flux command on the basis of an inverter frequency predicted value obtained by predicting an inverter frequency after passage of a time corresponding to a response time constant of an excitation magnetic flux of said AC motor and said DC voltage predicted value; and
a motor speed observer for calculating said inverter frequency predicted value on the basis of an actual inverter frequency or an inverter frequency command to drive said power converter, a vehicle body weight of said series hybrid vehicle, a torque command, and a motor load torque predicted value, said DC voltage predicted value, and a motor load torque predicted value estimated through an element of a waste time corresponding to said response time constant.

5. An electronic motor control system according to claim 1, wherein
said magnetic flux axis component includes a d-axis excitation magnetic flux component, and said current command includes a q-axis torque current command.

6. An electric motor control system according to claim 5, wherein
said electric motor controller, using current input and output values of at least one of circuit elements or control elements for generating the DC voltage which has a longer response time constant, calculates an output predicted value of the element having the longer response time constant after passage of a predetermined time, and calculates a predicted value of said DC voltage using the calculated output predicted value.

7. An electric motor control system according to claim 5, wherein
said electric motor control system is mounted in a series hybrid vehicle,
said electric motor controller further includes a magnetic flux command calculator for calculating a magnetic flux command on the basis of an inverter frequency predicted value obtained by predicting an inverter frequency after passage of a time corresponding to a response time constant of an excitation magnetic flux of said AC motor and said DC voltage predicted value; and
a motor speed observer for calculating said inverter frequency predicted value on the basis of an actual inverter frequency or an inverter frequency command to drive said power converter, a vehicle body weight of said series hybrid vehicle, a torque command, and a motor load torque predicted value, said DC voltage predicted value, and a motor load torque predicted value estimated through an element of a waste time corresponding to said response time constant.

8. A series hybrid vehicle comprising:
a generator;
an AC motor;
a power converter for driving said AC motor using a DC voltage output from said generator;
an electric motor controller for controlling said power converter; and
an engine for driving said generator,
wherein said DC voltage depends on a speed of said engine, and said electric motor controller estimates a magnetic flux including a magnetic flux axis component by using a DC voltage predicted value predicting a change in said DC voltage, determines a current command based on a torque command and said estimated magnetic flux, and controls said power converter based on said current command.

9. A series hybrid vehicle according to claim 8, wherein said electric motor controller, using current input and output values of at least one of circuit elements or control elements for generating the DC voltage which has a longer response time constant, calculates an output predicted value of the element having the longer response time constant after passage of a predetermined time, and calculates a predicted value of said DC voltage using the calculated output predicted value.

10. A series hybrid vehicle according to claim 8, wherein said electric motor controller further includes:
a magnetic flux command calculator for calculating a magnetic flux command on the basis of an inverter frequency predicted value obtained by predicting an inverter frequency after passage of a time corresponding to a response time constant of an excitation magnetic flux of said AC motor and said DC voltage predicted value; and
a motor speed observer for calculating said inverter frequency predicted value on the basis of an actual inverter frequency or an inverter frequency command to drive said power converter, a vehicle body weight of said series hybrid vehicle, a torque command, and a motor load torque predicted value, said DC voltage predicted value, and a motor load torque predicted value estimated through an element of a waste time corresponding to said response time constant.

11. An electronic motor control system according to claim 5, wherein
said magnetic flux axis component includes a d-axis excitation magnetic flux component, and said current command includes a q-axis torque current command.

12. A series hybrid vehicle according to claim 11, wherein said electric motor controller, using current input and output values of at least one of circuit elements or control elements for generating the DC voltage which has a longer response time constant, calculates an output predicted value of the element having the longer response time constant after passage of a predetermined time, and calculates a predicted value of said DC voltage using the calculated output predicted value.

13. A series hybrid vehicle according to claim 11, wherein said electric motor controller further includes:
a magnetic flux command calculator for calculating a magnetic flux command on the basis of an inverter frequency predicted value obtained by predicting an inverter frequency after passage of a time corresponding to a response time constant of an excitation magnetic flux of said AC motor and said DC voltage predicted value; and
a motor speed observer for calculating said inverter frequency predicted value on the basis of an actual inverter frequency or an inverter frequency command to drive said power converter, a vehicle body weight of said series hybrid vehicle, a torque command, and a motor load torque predicted value, said DC voltage predicted value, and a motor load torque predicted value estimated through an element of a waste time corresponding to said response time constant.

14. An electric motor control apparatus for controlling a pulse width of an AC voltage applied to an AC motor, wherein said apparatus estimates a magnetic flux including a magnetic flux axis component by using a DC voltage predicted value predicting a change in said DC voltage for regulating the amplitude of said AC voltage applied to said AC motor, determines a current command based on a torque command and said estimated magnetic flux, and controls said pulse width based on said current command.

15. An electric motor control apparatus according to claim 14, wherein
said pulse width control is PWM control or one-pulse control which makes variable a pulse width of one pulse generated in half of a period.

16. An electric motor control apparatus according to claim 14, wherein
said apparatus performs dq vector control by resolving a current of said AC motor into a magnetic flux axis component and a torque axis component electrically perpendicular to said magnetic flux axis component, said apparatus further comprising:
an first-order lag element filter having a response time constant of an excitation magnetic flux of said AC motor for receiving a magnetic flux command calculated based on said DC voltage predicted value;
a torque current converter for calculating said torque axis component of said motor current on the basis of an output signal of said first-order lag element filter and a torque command value; and
a slip frequency command calculator for calculating a slip of said AC motor on the basis of the output signal of said first-order lag element filter and a q-axis current command value.

17. An electronic motor control system according to claim 14, wherein
said magnetic flux axis component includes a d-axis excitation magnetic flux component, and said current command includes a q-axis torque current command.

18. An electric motor control system according to claim 5, wherein
said electric motor controller performs dq vector control by resolving any one or both of a current of said AC motor and a voltage thereof into a magnetic flux axis component and a torque axis component perpendicular to said magnetic flux axis component, and calculates said magnetic flux axis component using a predicted value of said DC voltage.

19. An electric motor control apparatus according to claim 17, wherein
said pulse width control is PWM control or one-pulse control which makes variable a pulse width of one pulse generated in half of a period.

20. An electric motor control apparatus according to claim 17, wherein
said apparatus performs dq vector control by resolving a current of said AC motor into a magnetic flux axis component and a torque axis component electrically perpendicular to said magnetic flux axis component, said apparatus further comprising:
an first-order lag element filter having a response time constant of an excitation magnetic flux of said AC motor for receiving a magnetic flux command calculated based on said DC voltage predicted value;
a torque current converter for calculating said torque axis component of said motor current on the basis of an output signal of said first-order lag element filter and a torque command value; and
a slip frequency command calculator for calculating a slip of said AC motor on the basis of the output signal of said first-order lag element filter and a q-axis current command value.

21. An electric motor control system comprising:
an AC motor:
a power converter for driving said AC motor using a DC voltage; and
an electric motor controller for performing pulse width control over said power converter, wherein said electric controller estimates a magnetic flux including a magnetic flux axis component by using a DC voltage predicted value predicting a change in said DC voltage, determines a current command based on a torque command and said estimated magnetic flux, and controls said power converter based on said current command.

22. An electronic motor control system according to claim 21, wherein
said magnetic flux axis component includes a d-axis excitation magnetic flux component, and said current command includes a q-axis torque current command.

23. An electric motor control method for controlling an electric motor controller which performs pulse width control over an AC voltage applied to an AC motor, wherein
said pulse width control is carried out by estimating a magnetic flux including a magnetic flux axis component by using a DC voltage predicted value predicting a change in said DC voltage, determining a current command based on a torque command and said estimated magnetic flux, and controlling said power converter based on said current command.

24. An electronic motor control method according to claim 23, wherein
said magnetic flux axis component includes a d-axis excitation magnetic flux component, and said current command includes a q-axis torque current command.

25. An electric motor control system for performing pulse width control over an AC voltage applied to an AC motor, wherein
said electric motor control system performs dq vector control by resolving a current of said AC motor into a magnetic flux axis component and a torque axis component electrically perpendicular to said magnetic flux axis component, said AC motor is an induction motor, and said electric motor control system further comprises:
a first-order lag element filter having a response time constant of an excitation magnetic flux of said induction motor for receiving a magnetic flux command calculated based on a DC voltage value;
a torque current converter for calculating said torque axis component of said motor current on the basis of an output signal of said first-order lag element filter and a torque command value; and
a slip frequency command calculator for calculating a slip frequency of said induction motor on the basis of the output signal of said first-order lag element filter and a q-axis current command value.

26. A series hybrid vehicle including an electric motor controller for performing pulse width control over an AC voltage applied to an AC motor, wherein
said electric motor controller performs dq vector control by resolving a current of said AC motor into a magnetic flux axis component and a torque axis component electrically perpendicular to said magnetic flux axis component, said AC motor is an induction motor, and said electric motor control system further comprises:
a first-order lag element filter having a response time constant of an excitation magnetic flux of said induction motor for receiving a magnetic flux command calculated based on a DC voltage value;
a torque current converter for calculating said torque axis component of said motor current on the basis of an output signal of said first-order lag element filter and a torque command value; and
a slip frequency command calculator for calculating a slip frequency of said induction motor on the basis of the output signal of said first-order lag element filter and a q-axis current command value.

27. An electric motor control apparatus for performing pulse width control over an AC voltage applied to an AC motor, wherein
said AC motor is an induction motor, and said apparatus further comprises:
a first-order lag element filter having a response time constant of an excitation magnetic flux of aid induction motor for receiving a magnetic flux command calculated based on a DC voltage value;
a torque current converter for calculating a torque axis component of a motor current on the basis of an output signal of said first-order lag element filter and a torque command value; and
a slip frequency command calculator for calculating a slip frequency of said induction motor on the basis of the output signal of said first-order lag element filter and a q-axis current command value.

* * * * *